United States Patent
Hagn et al.

(10) Patent No.: US 12,433,699 B2
(45) Date of Patent: *Oct. 7, 2025

(54) SURGICAL ROBOTIC SYSTEMS AND ROBOTIC ARM CARTS THEREOF

(71) Applicant: Covidien LP, Mansfield, MA (US)

(72) Inventors: Ulrich Hagn, Munich (DE); Jason T. Iceman, Cheshire, CT (US); Shane Reardon, Branford, CT (US); Noah N. Yang, New Haven, CT (US)

(73) Assignee: Covidien LP, Mansfield, MA (US)

( * ) Notice: Subject to any disclaimer, the term of this patent is extended or adjusted under 35 U.S.C. 154(b) by 261 days.

This patent is subject to a terminal disclaimer.

(21) Appl. No.: 18/095,127

(22) Filed: Jan. 10, 2023

(65) Prior Publication Data
US 2023/0248453 A1    Aug. 10, 2023

Related U.S. Application Data

(60) Provisional application No. 63/308,553, filed on Feb. 10, 2022.

(51) Int. Cl.
*A61B 50/13* (2016.01)
*A61B 34/30* (2016.01)

(52) U.S. Cl.
CPC .............. *A61B 34/30* (2016.02); *A61B 50/13* (2016.02); *A61B 2034/304* (2016.02); *A61B 2034/305* (2016.02)

(58) Field of Classification Search
CPC .......... B25J 5/007; A61B 34/30; A61B 50/13; A61B 34/37; A61B 90/37; A61B 2034/304; A61B 2034/305; B60B 19/12; B60B 19/003
See application file for complete search history.

(56) References Cited

U.S. PATENT DOCUMENTS

| | | | |
|---|---|---|---|
| 6,132,368 A | 10/2000 | Cooper | |
| 6,206,903 B1 | 3/2001 | Ramans | |
| 6,246,200 B1 | 6/2001 | Blumenkranz et al. | |
| 6,312,435 B1 | 11/2001 | Wallace et al. | |
| 6,331,181 B1 | 12/2001 | Tierney et al. | |
| 6,394,998 B1 | 5/2002 | Wallace et al. | |
| 6,424,885 B1 | 7/2002 | Niemeyer et al. | |

(Continued)

OTHER PUBLICATIONS

Marie et al., Review on A 3021 Recent Advancements in Robotic-assisted Minimally Invasive Surgery: The Philippines Perspective, 2021, IEEE, p. 1-5 (Year: 2021).*

(Continued)

*Primary Examiner* — McDieunel Marc
(74) *Attorney, Agent, or Firm* — Carter, DeLuca & Farrell LLP

(57) ABSTRACT

A surgical robotic system includes a robotic arm cart for supporting a robotic arm, and a docking station configured to be secured to an operating room floor around a surgical table. The robotic arm cart has a plurality of legs having wheels for facilitating movement of the robotic arm cart along the floor of the operating room. The robotic arm cart is configured to transition from an enlarged footprint state to a reduced footprint state. When the robotic arm cart is in the reduced footprint state, the robotic arm cart is connected to the docking station to provide stability to the robotic arm cart.

20 Claims, 8 Drawing Sheets

(56) References Cited

U.S. PATENT DOCUMENTS

| | | |
|---|---|---|
| 6,441,577 B2 | 8/2002 | Blumenkranz et al. |
| 6,459,926 B1 | 10/2002 | Nowlin et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,565,554 B1 | 5/2003 | Niemeyer |
| 6,645,196 B1 | 11/2003 | Nixon et al. |
| 6,659,939 B2 | 12/2003 | Moll |
| 6,671,581 B2 | 12/2003 | Niemeyer et al. |
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban, III et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |

(56) References Cited

U.S. PATENT DOCUMENTS

| | | |
|---|---|---|
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,165 B2 | 10/2018 | Power |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,568,704 B2 * | 2/2020 | Savall .................. A61B 90/60 |
| 10,575,909 B2 | 3/2020 | Robinson et al. |
| 10,592,529 B2 | 3/2020 | Hoffman et al. |
| 10,595,946 B2 | 3/2020 | Nixon |
| 10,856,948 B2 | 12/2020 | Cagle et al. |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald, II |
| 10,905,506 B2 | 2/2021 | Itkowitz et al. |
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |
| 10,993,775 B2 | 5/2021 | Cooper et al. |
| 11,000,331 B2 | 5/2021 | Krom et al. |

(56) References Cited

U.S. PATENT DOCUMENTS

| | | |
|---|---|---|
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |
| 11,058,501 B2 | 7/2021 | Tokarchuk et al. |
| 11,076,925 B2 | 8/2021 | DiMaio et al. |
| 11,090,119 B2 | 8/2021 | Burbank |
| 11,096,687 B2 | 8/2021 | Flanagan et al. |
| 11,098,803 B2 | 8/2021 | Duque et al. |
| 11,109,925 B2 | 9/2021 | Cooper et al. |
| 11,116,578 B2 | 9/2021 | Hoffman et al. |
| 11,129,683 B2 | 9/2021 | Steger et al. |
| 11,135,029 B2 | 10/2021 | Suresh et al. |
| 11,147,552 B2 | 10/2021 | Burbank et al. |
| 11,147,640 B2 | 10/2021 | Jarc et al. |
| 11,154,373 B2 | 10/2021 | Abbott et al. |
| 11,154,374 B2 | 10/2021 | Hanuschik et al. |
| 11,160,622 B2 | 11/2021 | Goldberg et al. |
| 11,160,625 B2 | 11/2021 | Wixey et al. |
| 11,161,243 B2 | 11/2021 | Rabindran et al. |
| 11,166,758 B2 | 11/2021 | Mohr et al. |
| 11,166,770 B2 | 11/2021 | DiMaio et al. |
| 11,166,773 B2 | 11/2021 | Ragosta et al. |
| 11,173,597 B2 | 11/2021 | Rabindran et al. |
| 11,185,378 B2 | 11/2021 | Weir et al. |
| 11,191,596 B2 | 12/2021 | Thompson et al. |
| 11,197,729 B2 | 12/2021 | Thompson et al. |
| 11,213,360 B2 | 1/2022 | Hourtash et al. |
| 11,221,863 B2 | 1/2022 | Azizian et al. |
| 11,234,700 B2 | 2/2022 | Ragosta et al. |
| 11,241,274 B2 | 2/2022 | Vaders et al. |
| 11,241,290 B2 | 2/2022 | Waterbury et al. |
| 11,259,870 B2 | 3/2022 | DiMaio et al. |
| 11,259,884 B2 | 3/2022 | Burbank |
| 11,272,993 B2 | 3/2022 | Gomez et al. |
| 11,272,994 B2 | 3/2022 | Saraliev et al. |
| 11,291,442 B2 | 4/2022 | Wixey et al. |
| 11,291,513 B2 | 4/2022 | Manzo et al. |
| 11,369,443 B2 * | 6/2022 | Shelton, IV ....... A61B 17/3421 |
| 2020/0315721 A1 * | 10/2020 | Rabindran ............. A61B 34/00 |
| 2021/0015565 A1 | 1/2021 | Kostrzewski et al. |
| 2022/0071827 A1 * | 3/2022 | Phillips ..................... H02J 9/06 |
| 2024/0261052 A1 * | 8/2024 | Guerrera ............... B60B 33/026 |

OTHER PUBLICATIONS

Chioson et al., Recent Advancements in Robotic Minimally Invasive Surgery: A Review from the Perspective of Robotic Surgery in the Philippines, 2020, IEEE, p. 797-808 (Year: 2020).*

Zom et al., A Novel Telemanipulated Robotic Assistant for Surgical Endoscopy: Preclinical Application to ESD, 2017, IEEE, pg. (Year: 2017).*

Chatzilias et al., Robotic control in hand-assisted laparoscopic nephrectomy in humans—a pilot study, 2004, IEEE, p. 2742-2745 (Year: 2004).*

* cited by examiner

SURGICAL ROBOTIC SYSTEMS AND ROBOTIC ARM CARTS THEREOF

CROSS-REFERENCE TO RELATED APPLICATIONS

The present application claims the benefit of and priority to U.S. Provisional Patent Application Ser. No. 63/308,553, filed on Feb. 10, 2022, the entire contents of which being incorporated herein by reference.

FIELD

The present technology is generally related to surgical robotic systems used in minimally invasive medical procedures.

BACKGROUND

Robotic surgical systems are used in minimally invasive medical procedures because of their increased accuracy and expediency relative to handheld surgical instruments. In these robotic surgical systems, a robotic arm may support a surgical instrument having an end effector mounted thereto by a wrist assembly. In operation, the robotic arm is moved to a position over a patient and then guides the surgical instrument into a small incision via a surgical port or a natural orifice of a patient to position the end effector at a work site within the patient's body.

Some robotic surgical systems employ a cart to support the robotic arm and allow a clinician to move the robotic arm to different locations within the operating room. During a surgical procedure, it would be desirable for the cart to be held in a stationary position without occupying too much space within the operating room.

SUMMARY

In one aspect of the disclosure, a robotic arm cart is provided that includes a base for supporting a robotic arm thereon, and a plurality of legs coupled to the base and configured to support the base above a surface. The robotic arm cart is configured to transition between a first state in which the robotic arm cart assumes a first footprint and a second state in which the robotic arm cart assumes a second footprint that is different from the first footprint.

In aspects, one of the legs may be movably coupled to the base such that the leg is configured to move relative to the base between a first position, in which the robotic arm cart assumes the first footprint, and a second position, in which the robotic arm cart assumes the second footprint.

In aspects, the leg may be configured to pivot, swivel, and/or slide relative to the base between the first and second positions.

In aspects, each of the legs may be configured to move relative to the base between the first position and the second position.

In aspects, the legs may be configured to both rotate relative to the base between the first and second positions and translate along respective longitudinal axes thereof to lower the base relative to the surface.

In aspects, the robotic arm cart may further include a plurality of wheels respectively coupled to an end of the plurality of legs.

In aspects, the wheels may be positioned closer to an outer periphery of the base when the robotic arm cart is in the second state than when the robotic arm cart is in the first state.

In aspects, the first footprint may have a larger perimeter than the second footprint.

In aspects, the end of each of the legs may be configured to move relative to the base to move the wheels between a position further from an outer periphery of the base to a position closer to the outer periphery of the base.

In aspects, the robotic arm cart may further include a docking stem extending from the base and configured to engage a docking station.

In aspects, the robotic arm cart may further include an auxiliary leg extending downwardly from the base. The auxiliary leg may be configured to support the base above the surface when the robotic arm cart transitions to the second state.

In aspects, the auxiliary leg may have an end supporting a wheel or a foot thereon, and the legs may be configured to move vertically relative to the base whereby the base is lowered toward the surface and the docking stem engages the docking station. In addition, the wheel or foot of the auxiliary leg may contact the surface and support the base above the surface.

In accordance with another aspect of the disclosure, a surgical robotic system is provided that includes a docking station configured to be positioned on a floor of an operating room and adjacent a surgical table, and a robotic arm cart that includes a base for supporting a robotic arm thereon, a docking stem coupled to the base and configured to engage the docking station to stabilize the robotic arm cart, a plurality of legs coupled to the base and configured to support the base above the floor, and a plurality of wheels respectively coupled to the legs. One or more of the legs is configured to move relative to the base to transition the robotic arm cart between a first state in which the robotic arm cart assumes an enlarged footprint and a second state in which the robotic arm cart assumes a reduced footprint relative to the first state.

In aspects, the docking station may be configured to be seated on the floor of the operating room and to at least partially surround the surgical table. The docking stem of the robotic arm cart may be configured to move vertically relative to the base to selectively engage the docking station.

In aspects, the docking station may be a plate configured to magnetically couple to the docking stem.

In aspects, the docking stem may be configured to engage the docking station in response to the leg moving relative to the base from an extended position to a retracted position.

In aspects, the robotic arm cart may further include an auxiliary leg extending downwardly from the base. The auxiliary leg may be configured to support the base above the floor of the operating room when the leg moves relative to the base from the extended position to the retracted position.

In aspects, the docking station may be a rail defining a channel therein configured for receipt of one of the wheels.

In aspects, the docking stem may include a magnet, and the docking stem may be configured to move vertically relative to the base to engage the magnet of the docking stem with the rail.

In accordance with further aspects of the disclosure, a robotic arm cart is provided that includes a base for supporting a robotic arm thereon, a docking stem coupled to the base and configured to attach to a docking station in an operating room, a plurality of legs coupled to the base and configured to support the base above a floor of the operating room, and a plurality of wheels respectively coupled to the legs. The legs are configured to transition from an expanded state to a contracted state relative to the base to change a configuration of the robotic arm cart.

Further details and exemplary aspects of the disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the disclosure are described herein with reference to the accompanying drawings, wherein.

DETAILED DESCRIPTION

Figure 1:
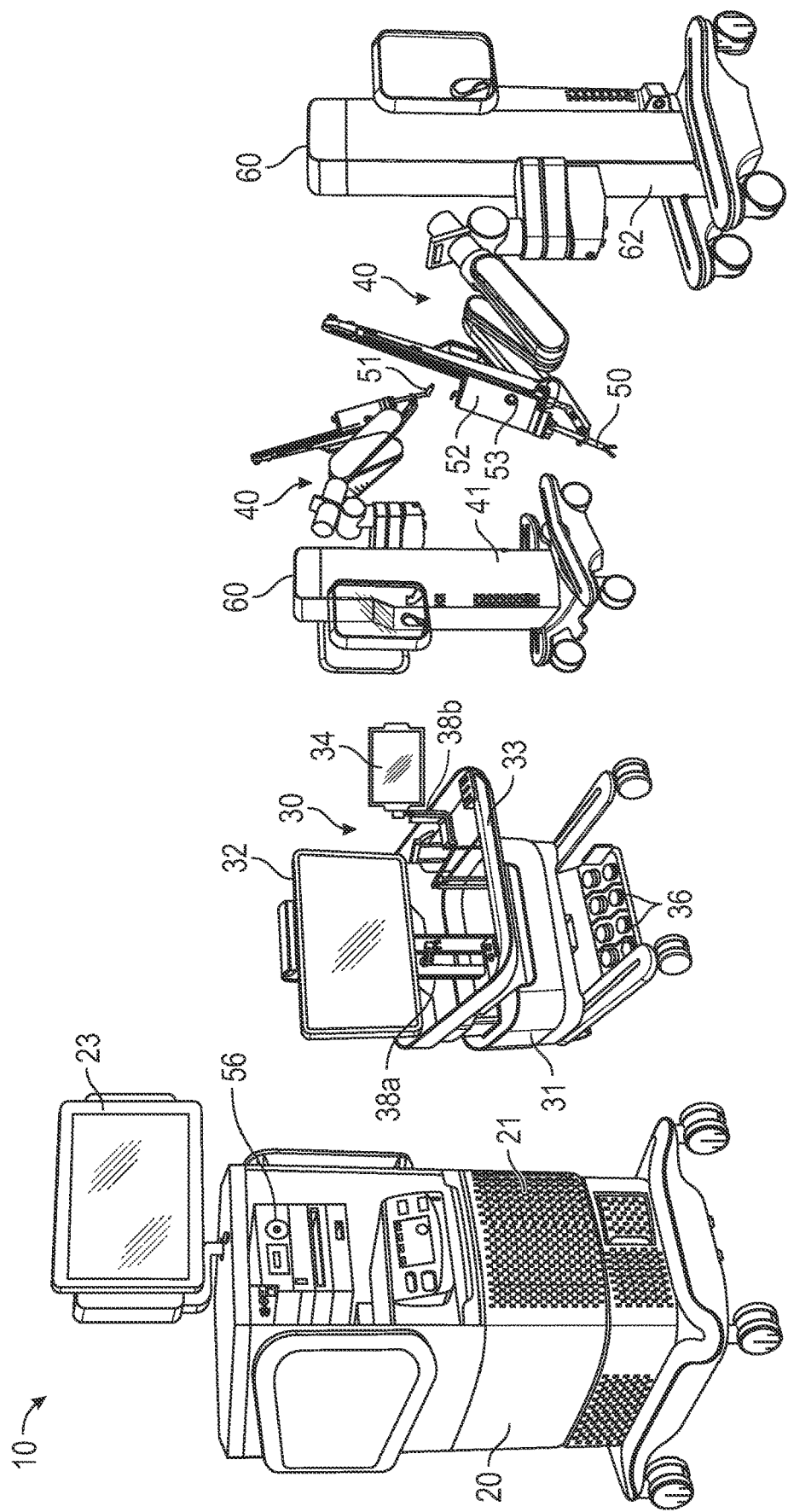
FIG. 1 is a schematic illustration of a surgical robotic system including a control tower, a console, and one or more surgical robotic arms supported on a robotic arm cart.

Embodiments of the disclosed surgical robotic system are described in detail with reference to the drawings, in which like reference numerals designate identical or corresponding elements in each of the several views. As used herein the term "distal" refers to that portion of the surgical robotic system and robotic arm cart thereof that is closer to a floor of an operating room, while the term "proximal" refers to that portion of the surgical robotic system and robotic arm cart thereof that is further from the floor.

In robotic surgery, the position stability of a base of a robotic arm is important for the accuracy of the arm. Any change of the position or orientation ("pose") of the robot base transfers to the pose of the end-effector and thus impacts the accuracy of the procedure. Therefore, the supporting structures (e.g., the robotic arm cart) on which a robot is mounted should have high position stability. For carts, this drives the size of the carts to achieve the following: 1. The cart is rigid; and 2. The footprint of the cart (e.g., the perimeter outlined by the casters) is large enough to provide stability. Achieving the last aspect may be challenging because the carts are preferably close to the patient and the space around an operating room bed is constrained and valuable for access to the patient, especially when multiple carts need to be positioned as close as possible to each other. However, reducing the footprint of a cart renders the cart more susceptible to tipping over.

This disclosure is based on a variable footprint of the cart so that for transport and for applications where space is not constrained (e.g., single arm applications), a larger footprint is available to provide sufficient stability against tip-over; and for applications where space is a challenge (e.g., multi arm applications), the footprint of the cart may be reduced and stability reestablished by docking the cart to a frame around the operating room bed. This approach allows for a high flexibility in relation to a number of arms in an application, the smallest possible footprint, and low modification effort of the operating room.

With reference to FIG. 1, a surgical robotic system 10 includes a control tower 20, which is connected to all of the components of the surgical robotic system 10 including a surgical console 30 and one or more robotic arms 40. Each of the robotic arms 40 includes a surgical instrument 50 and instrument drive unit 52 removably coupled thereto. Each of the robotic arms 40 is also coupled to and supported on a movable robotic arm cart 60.

The surgical instrument 50 is configured for use during minimally invasive surgical procedures. In embodiments, the surgical instrument 50 may be configured for open surgical procedures. In embodiments, the surgical instrument 50 may be an endoscope, such as an endoscopic camera 51, configured to provide a video feed for the user. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue.

One of the robotic arms 40 may include the endoscopic camera 51 configured to capture video of the surgical site.

The endoscopic camera 51 may be a stereoscopic endoscope configured to capture two side-by-side (i.e., left and right) images of the surgical site to produce a video stream of the surgical scene. The endoscopic camera 51 is coupled to a video processing device 56, which may be disposed within the control tower 20. The video processing device 56 may be any computing device as described below configured to receive the video feed from the endoscopic camera 51 perform the image processing based on the depth estimating algorithms of the disclosure and output the processed video stream.

The surgical console 30 includes a first display 32, which displays a video feed of the surgical site provided by camera 51 of the surgical instrument 50 disposed on the robotic arms 40, and a second display 34, which displays a user interface for controlling the surgical robotic system 10. The first and second displays 32 and 34 are touchscreens allowing for displaying various graphical user inputs.

The surgical console 30 also includes a plurality of user interface devices, such as foot pedals 36 and a pair of handle controllers 38a and 38b which are used by a user to remotely control robotic arms 40. The surgical console further includes an armrest 33 used to support clinician's arms while operating the handle controllers 38a and 38b.

The control tower 20 includes a display 23, which may be a touchscreen, and outputs on the graphical user interfaces (GUIs). The control tower 20 also acts as an interface between the surgical console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgical console 30, in such a way that robotic arms 40 and the surgical instrument 50 execute a desired movement sequence in response to input from the foot pedals 36 and the handle controllers 38a and 38b.

Each of the control tower 20, the surgical console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area networks, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-2003 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein. The robotic arm 40 also includes a plurality of manual override buttons 53 disposed on the instrument drive unit 52 and the setup arm 62, which may be used in a manual mode. The user may press one or more of the buttons 53 to move the component associated with the button 53.

Figure 2:
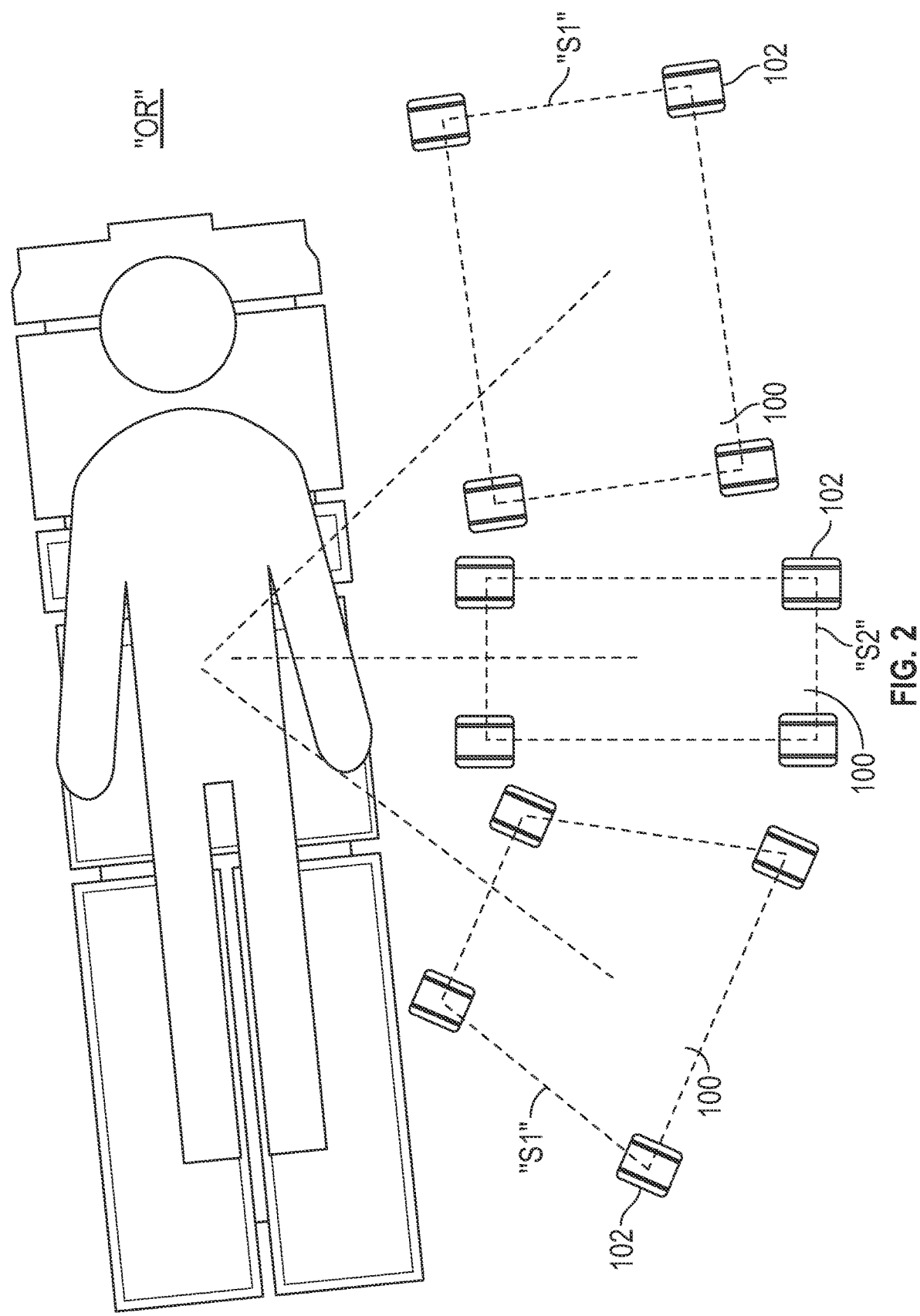
FIG. 2 is a top view of a plurality of robotic arm carts of the surgical robotic system of FIG. 1 positioned alongside a surgical table.

With reference to FIG. 2, the surgical robotic system 10 includes an aspect of a robotic arm cart 100 configured for supporting the robotic arm 40 (FIG. 1) thereon and for transporting the robotic arm 40 to select locations within and/or outside of an operating room "OR." Generally, the robotic arm cart 100 is configured to transition between a first state ("S1"), in which the robotic arm cart 100 assumes an enlarged footprint, and a second state "S2" in which the robotic arm cart 100 assumes a reduced footprint relative to the first state "S1." The footprint of the robotic arm cart 100 may be defined by a perimeter outlined by a plurality of wheels 102 of the robotic arm cart 100. In aspects, in the first state "S1," the footprint may assume a trapezoidal shape or a first rectangular shape, and in the second state "S2" the footprint may assume a second rectangular shape that is narrower than the first rectangular shape. Other suitable shapes for the footprints are also contemplated.

Figure 3:
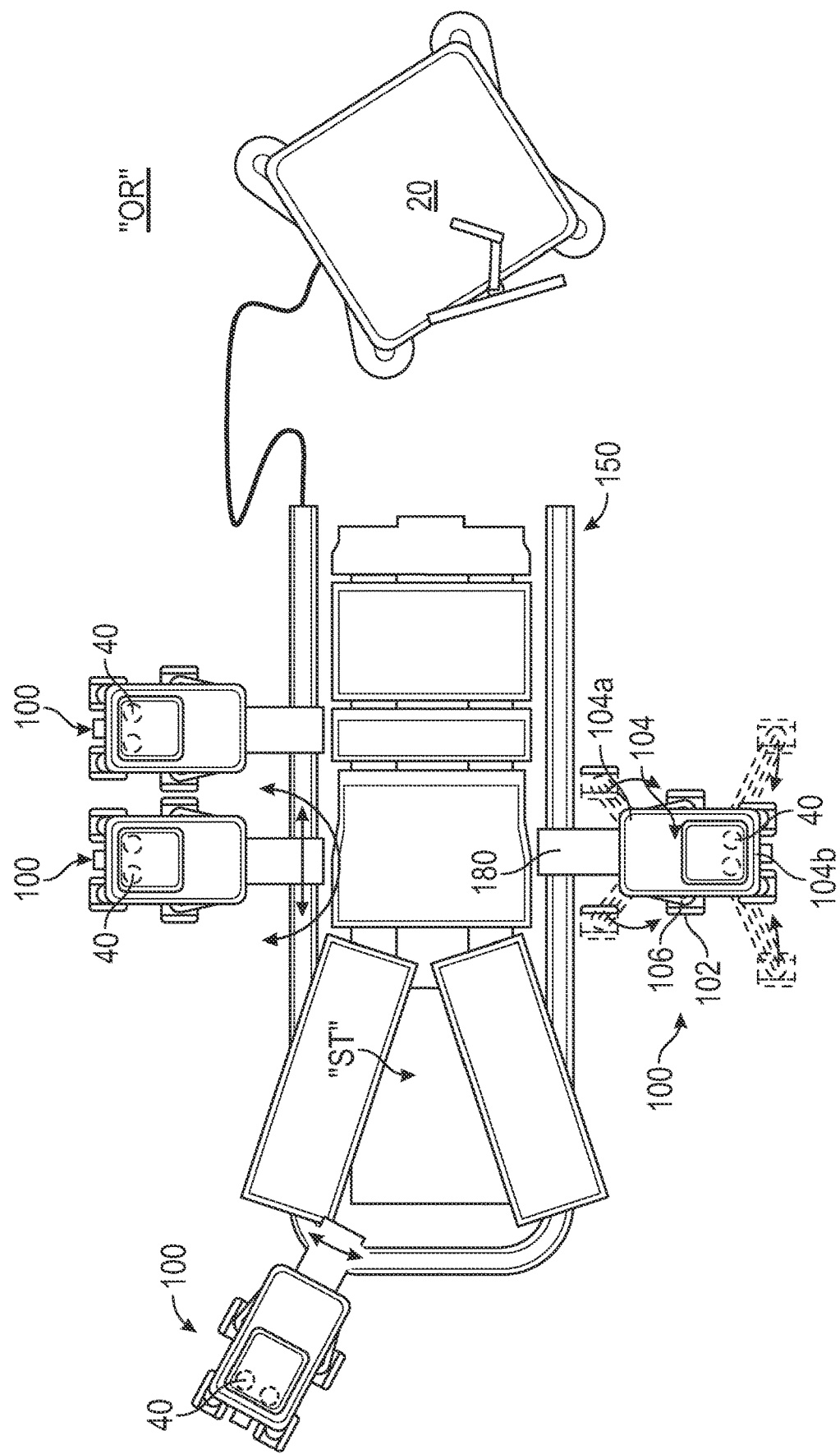
FIG. 3 is a top view illustrating a plurality of robotic arm carts coupled to a docking station with each having a reduced footprint.
Figure 4A:
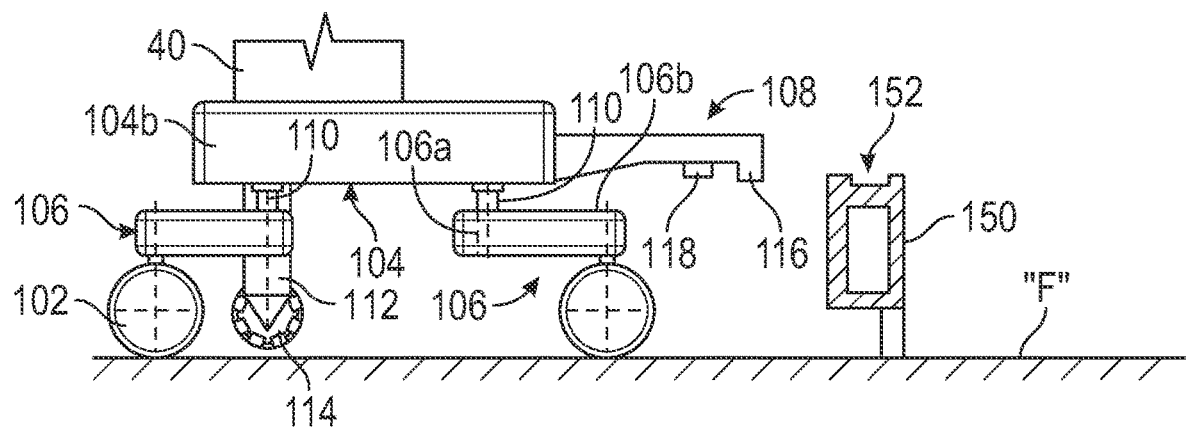
FIG. 4A is a side view illustrating one of the robotic arm carts of FIG. 3 including a stem thereof disconnected from the docking station of FIG. 3.
Figure 4B:
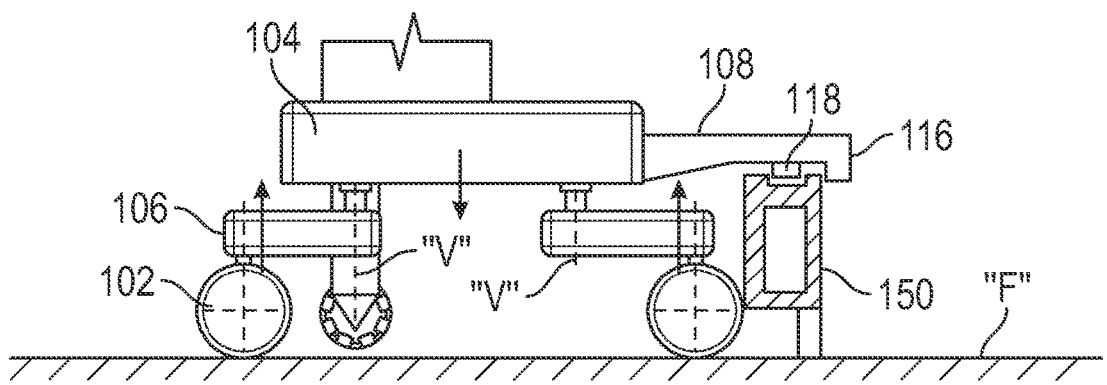
FIG. 4B is a side view illustrating the robotic arm cart of FIG. 4A with the stem thereof shown being attached to the docking station.
Figure 4C:
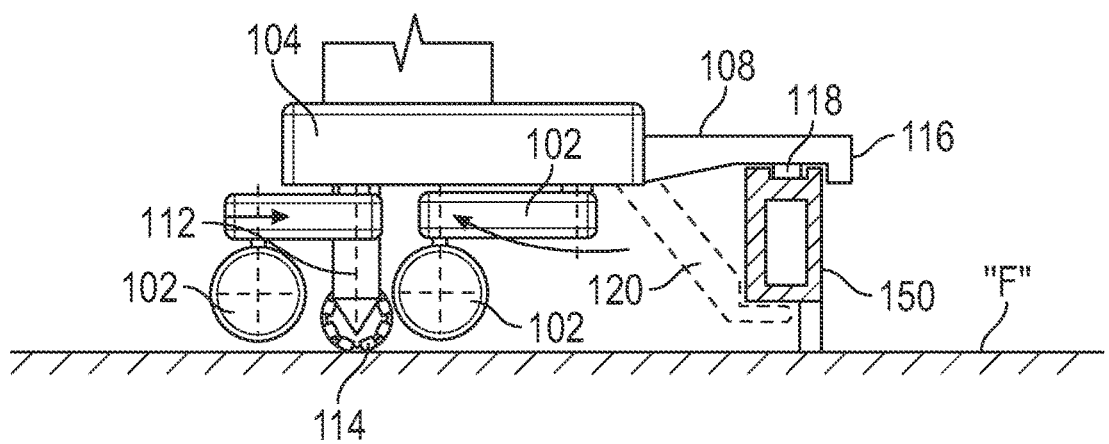
FIG. 4C is a side view illustrating the robotic arm cart of FIG. 4B with a stabilizing arm securing the robotic arm cart to the docking station.

With reference to FIG. 3-4C, the surgical robotic system 10 includes a docking station 150, such as, for example, a rail (tubular or non-tubular), and a plurality of robotic arm carts 100 positioned around the docking station 150 and each supporting a respective robotic arm 40. The docking station may be a rail that partially or entirely surrounds a surgical table "ST" and is affixed to a floor of the operating room "OR." In aspects, the docking station 150 may be a monolithic structure or a plurality of pieces that connect to one another around the surgical table "ST." The docking station 150 may be tubular or otherwise define channels therethrough to permit the passage of electrical and/or data cables. The docking station 150 may incorporate data and/or power ports for connection with each of the robotic arm carts 100. It is contemplated that the cables of the docking station 150 may be connected to a power source within the docking station 150 or an external power source, such as the control tower 20. When the robotic arm carts 100 are electrically coupled to the docking station 150, and with the docking station electrically coupled to the control tower 20, there is a reduction in the number of cables running directly from each robotic arm cart 100 to the control tower 20.

Each robotic arm cart 100 generally includes a base 104 for supporting the robotic arm 40 on an upper surface thereof, a plurality of supports or legs 106 extending downwardly from the base 104, and a docking stem 108 projecting radially outward form a front end portion 104a of the base 104 and configured to detachably couple the robotic arm cart 100 to the docking station 150, as will be described in further detail below. The base 104 of the robotic arm cart 100 may detachably couple the robotic arm 40 thereto via any suitable fastening mechanism, such as, for example, a threaded connection, a bayonet-type connection, a press-fit connection, etc. In aspects, the surgical robotic arm 40 may be permanently affixed on the base 104.

As best shown in FIGS. 4A-4C, each of the legs 106 of the robotic arm cart 100 extend in parallel relation to the base 104 and the floor "F" such that the legs 106 flare outwardly relative to an outer periphery of the base 104 to inhibit tipping of the robotic arm cart 100. In other aspects, the legs 106 may extend at an oblique angle relative to the base 104 or perpendicular relative to the base 104. Each of the legs 106 has a first end 106a coupled to a respective corner of the base 104, and a second end 106b having a wheel or caster 102 coupled thereto to allow for a rolling motion of the robotic arm cart 100 along the floor "F" of the operating room "OR."

The first end 106a of the legs 106 may be rotatably coupled to the base 104 via a joint 110 to allow the legs 106 to rotate inwardly relative to the base 104 from an expanded state (shown in phantom in FIG. 3) to a contracted state (FIG. 3). For example, the joint 110 may be a screw joint configured to adjust both the height of the base 104 relative to the legs 106 and the rotational orientation of the legs 106 relative to the base 104. As such, the joint 110 may first move only the base 104 in a vertical direction relative to the legs 106 until the wheels 102 thereof are unloaded (e.g., suspended from the floor "F") and thereafter rotate the legs 106 relative to the base 104 from the expanded state to the contracted state. In other aspects, the joint 110 may be replaced with a pin configured to move both perpendicularly relative to the base 104 (e.g., by actuation of a motor or by manually pushing down on the base 104 to overcome a threshold resistive force) to raise or lower the base 104 relative to the legs 106, and about a longitudinal axis of the pin to rotate the legs 106 between the contracted and expanded states. In further aspects still, the legs 106 may be configured to extend or retract along a longitudinal axis thereof by including a series of connected telescopic tubes (not shown) that allow for the extension and retraction thereof. It is contemplated that due to the legs 106 being flared outwardly, when the legs 106 retract vertically, the footprint of the robotic arm cart 100 may be reduced. In other aspects, the first end 106a of the legs 106 may be movably coupled to the base 104 via a swivel joint, a sliding joint, or a combination thereof.

The robotic arm cart 100 may include a single motor or motors (not explicitly shown) that receive power from a battery of the robotic arm cart 100 or an external power source (e.g., from the docking station 150) and which drive the movement of the legs 106 relative to the base 104. The motors may be electric, pneumatic, hydraulic, etc. In aspects, an operator may manually move the legs 106 between the expanded and contracted states via a mechanical actuation of, for example, the foot pedals 36 or the handle controllers 38a and 38b (FIG. 1). In the expanded state, the legs 106 and the wheels 102 thereof are positioned radially outward of the outer periphery of the base 104 (shown in phantom in FIG. 3). In the contracted state (FIG. 3), the legs 106 and wheels 102 thereof are positioned adjacent the outer periphery of the base 104, and in some instances, underneath the base 104. As such, the adjustability of the legs 106 allows for a change in the overall footprint of the robotic arm cart 100 from an enlarged state to a reduced state. While four legs 106 are shown, it is contemplated that the robotic arm cart 100 may include more or less than four legs 106.

Figure 5A:
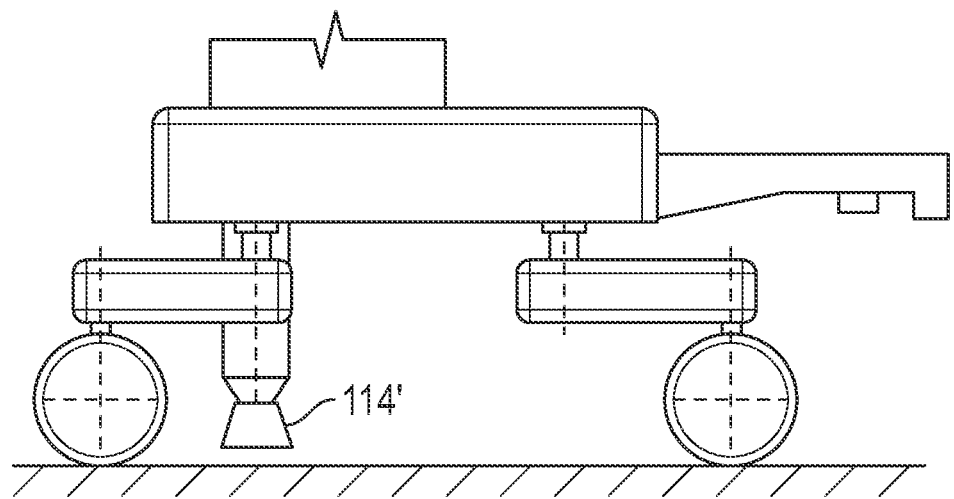
FIG. 5A is a side view illustrating another robotic arm cart including a docking stem, a plurality of wheeled legs, and an auxiliary leg having a foot.
Figure 5B:
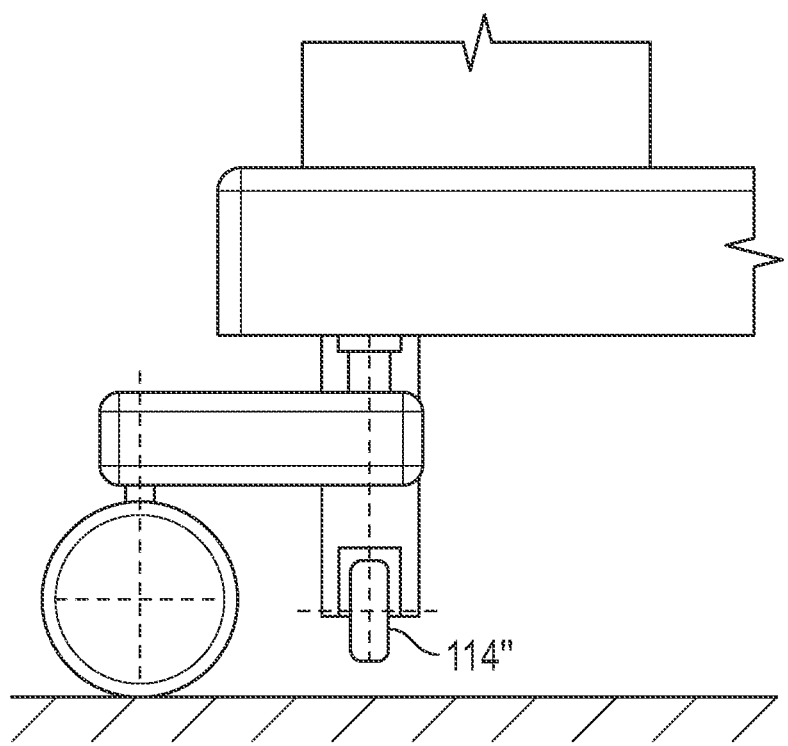
FIG. 5B is a partial side view illustrating another robotic arm cart including a wheeled leg and an auxiliary leg having a wheel.

With continued reference to FIGS. 4A-4C, the robotic arm cart 100 further includes an auxiliary leg or support 112 extending downwardly from a rear end portion 104b of the base 104. As such, the auxiliary leg 112 and the docking stem 108 are positioned at opposite end portions 104a, 104b of the base 104. The auxiliary leg 112 has a bottom end supporting a wheel 114, such as, for example, an omni wheel that allows for rolling of the robotic arm cart 100 in a plurality of directions. In other aspects, the bottom end of the auxiliary leg 100 may have a stopper 114' (FIG. 5A) that resists motion of the robotic arm cart 100 along the floor "F," a single axis wheel 114" (FIG. 5B) that permits rolling motion of the robotic arm cart 100 along a single axis parallel to and along the docking station 150, or a caster (not shown). Retraction of the legs 106 in a vertical direction by the joint 110 lowers the base 104 relative to the floor "F" until the omni wheel 114 engages the floor "F" and the wheels 102 of the legs 106 lift off the floor "F" such that the omni wheel 102 and the docking stem 108 of the robotic arm cart 100 are the only components suspending the base 104 from the floor "F."

The docking stem 108 of the robotic arm cart 100 includes a hooked end 116 and a boss 118 extending downwardly from the docking stem 108. The docking station 150 defines a channel 152 in an upper surface thereof that extends along the length of the docking station 150. The channel 152 is configured for receipt of the boss 118 of the docking stem 108 such that the hooked end 116 and the boss 118 of the docking stem 108 secure to the docking station 150 and inhibit movement of the robotic arm cart 100 in directions toward or away from the docking station 150. The hooked end 116 of the docking stem 108 may include an electrical plug (not explicitly shown) for electrically connecting with electrical cables of the docking station 150. It is contemplated that the engagement between the docking stem 108 and the docking station 150 may allow for sliding movement of the robotic arm cart 100 relative to and along the docking station 150 to adjust a position of the surgical robotic arm 40 relative to the surgical table "ST" (FIG. 3). As shown in FIG. 4C, a stabilizing arm 120 may be provided that secures the base 104 of the robotic arm cart 100 to the docking station 50 and prohibits sliding of the robotic arm cart 100 relative to the docking station 150.

In operation, with a surgical robotic arm 40 secured to the base 104 of the robotic arm cart 100, the robotic arm cart 100 is rolled to a select location along the surgical table "ST" (FIG. 3) with the docking stem 108 adjacent and facing the docking station 150, as shown in FIG. 4A. The robotic arm cart 100 is moved toward the docking station 150 until the hooked end 116 of the docking stem 108 is suspended above the docking station 150 with the boss 118 of the docking stem 108 aligned with the channel 152 of the docking station 150, as shown in FIG. 4B. The motors in the robotic arm cart 100 are actuated to rotate the joints 110 whereby the base 104 is lowered relative to the legs 106 along a vertical axis "V" (FIG. 4B).

The continued lowering of the base 104 toward the wheels 102 of the legs 106 ultimately results in the wheel 114 of the auxiliary leg 112 engaging the floor "F" and the wheels 102 of the legs 106 raising off the floor "F," as shown in FIG. 4C. Concurrently with the wheel 114 of the auxiliary leg 112 engaging the floor "F," the boss 118 of the docking stem 108 is received in the channel 152 of the docking station 150 and the hooked end 116 of the docking stem 108 engages the docking station 150 such that the docking stem 108 is in grasping engagement with the docking station 150. In this state, the robotic arm cart 100 remains capable of sliding along and relative to the docking station 150 (and the surgical table "ST"), but is prohibited from rotating relative to the docking station 150, tilting, or moving in a direction toward or away from the docking station 150. In surgical situations where slidability of the robotic arm cart 100 along the docking station 100 is not preferred, the stabilizing arm 120 (FIG. 4C) may be connected to the base 104 and the docking station 150.

With the wheels 102 of the legs 106 no longer engaged with the floor "F," the continued rotation of the joints 110 rotates the legs 106 therewith about a single axis "V" (FIG. 4B) defined through the joint 110. Accordingly, the wheels 102 of the legs 106 are rotated inwardly toward the base 104 from the expanded state (FIGS. 4A and 4B) to the contracted state (FIG. 4C) to reduce the footprint of the robotic arm cart 100. In aspects, a single actuation of the motors of the robotic arm cart 100 simultaneously lowers the base 104 relative to the legs 106 and rotates the legs 106 relative to the base 104.

With the reduced footprint, a plurality of the robotic arm carts 100 may be positioned in close proximity with one another along the surgical table "ST" while remaining stable due to the connection between the docking stem 108 and the docking station 150. The reduced footprint configuration of the robotic arm cart 100 may also be used when storing the robotic arm cart 100. It is contemplated that in surgical situations where space in the operating room "OR" is plentiful, for example, when only a single robotic arm cart 100 is needed, or during transport, the wheels 102 of the legs 106 may be locked and the legs 106 may remain in the expanded position. Since the robotic arm cart 100 will be more stable with the legs 106 in the expanded position, engagement of the docking stem 108 with the docking station 150 may not be needed.

In aspects, the movement of the legs 106 may reduce a width of the robotic arm cart 100 (defined in a direction parallel with the docking station 150) while maintaining, increasing, or decreasing a length of the robotic arm cart 10 (defined in a direction perpendicularly with the docking station 150). It is further contemplated that the movement of the legs 106 may adjust the shape of the robotic arm cart 100 (e.g., from a square to a rectangle).

Figure 6A:
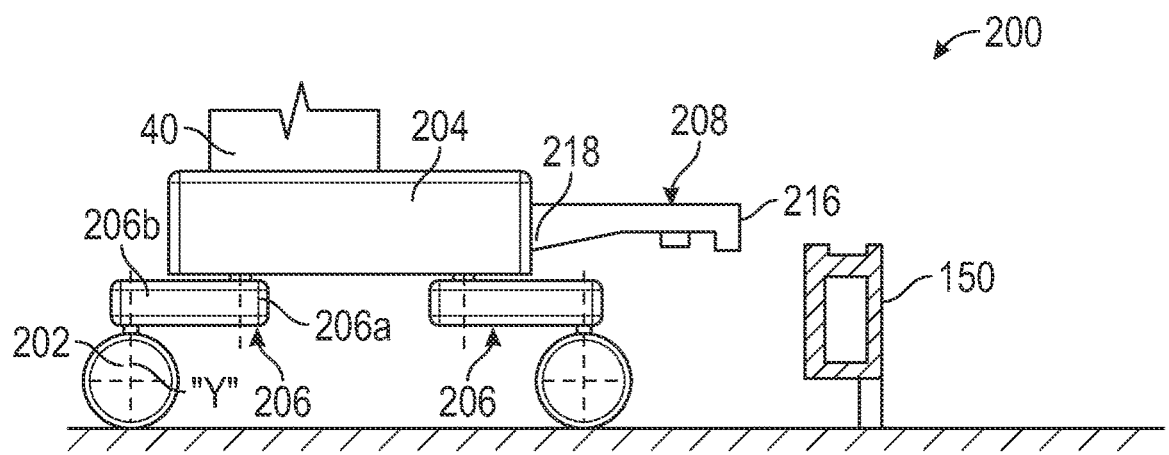
FIG. 6A is a side view illustrating another robotic arm cart including a plurality of wheeled legs and a docking stem, which is shown disconnected from the docking station of FIG. 3.
Figure 6B:
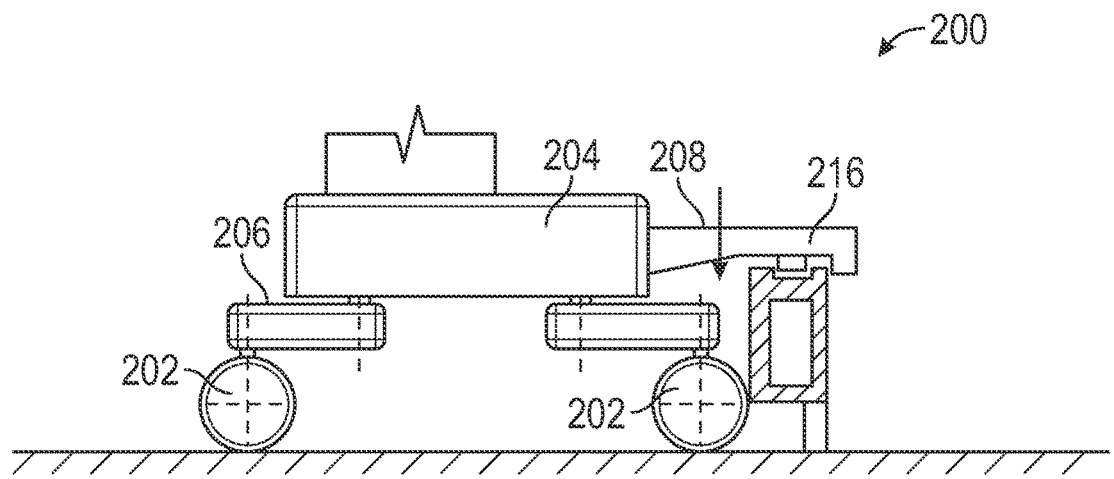
FIG. 6B is a side view illustrating the robotic arm cart of FIG. 6A with the stem thereof shown being connected to the docking station.
Figure 6C:
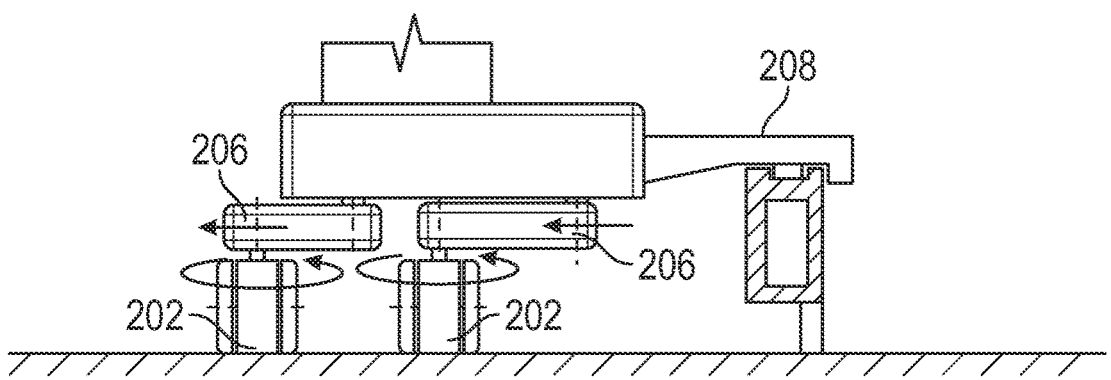
FIG. 6C is a side view illustrating the robotic arm cart of FIG. 6B with one of the legs in a retracted state and the wheels thereof rotated 90 degrees.

With reference to FIGS. 6A-6C, another type of robotic arm cart 200 of the surgical robotic system of FIG. 1 is shown. The robotic arm cart 200 is similar to and may include any of the features of the robotic arm cart 100 of FIGS. 4A-4C except as explicitly contradicted below.

The robotic arm cart 200 generally includes a base 204 for supporting a robotic arm 40 thereon, a plurality of legs 206 coupled to and extending downwardly from the base 204, and a docking stem 208 projecting from the base 204. The legs 206 have opposing first and second ends 206*a*, 206*b* with the first end 206*a* coupled to the base 204 and the second end 206*b* supporting a caster 202. One or more of the legs 206 is coupled to the base 204 via a respective joint 210 (e.g., a pivot joint) to allow for rotational movement of the legs 206 from an expanded state (FIGS. 6A, 6B) to a contracted state (FIG. 6C). The joint 210 may be powered by a motor (not explicitly shown) or the legs 206 may be manually rotated relative to the base 204. In other aspects, the legs 206 may be coupled to the base 204 via a sliding joint, a swivel joint, a screw joint, or the like.

The casters 202 are configured to rotate 90 degrees about a vertical axis "Y" (FIG. 6A) between a first orientation (FIGS. 6A, 6B) in which a rolling axis (extending through the page) of the casters 202 is parallel with the docking station 150, and a second orientation (FIG. 6C) in which the rolling axis of the casters 202 is perpendicular to the docking station 150. It is contemplated that the casters 202 may be rotatable 360 degrees in either direction. The docking stem 208 has a hooked distal end 216, and a proximal end 218 slidably coupled to the base 204 such that a vertical position of the stem 208 relative to the base 204 is adjustable.

In operation, with a surgical robotic arm 40 secured to the base 204 of the robotic arm cart 200, the robotic arm cart 200 is rolled to a select location along the surgical table with the docking stem 208 adjacent and facing the docking station 150, as shown in FIG. 6A. The robotic arm cart 200 is moved toward the docking station 150 until the hooked distal end 216 of the docking stem 208 is suspended above the docking station 150, as shown in FIG. 6B. The stem 208 is translated along a vertical axis (e.g., via actuation of a motor) relative to the base 204 and toward the floor to engage the hooked distal end 216 of the stem 208 with the docking station 150. With the robotic arm cart 200 stabilized by the connection between the docking stem 208 and the docking station 150, the legs 206 are moved (e.g., rotated) from the expanded state to the contracted state (FIG. 6C) to reduce the footprint of the robotic arm cart 200. In surgical situations where rolling motion of the robotic arm cart 200 is preferred, the casters 202 of the robotic arm cart 200 may be rotated from the first rotational orientation (FIG. 6B) to the second rotational orientation (FIG. 6C) to allow for rolling motion of the robotic arm cart 200 relative to and along the docking station 150.

Figure 7A:
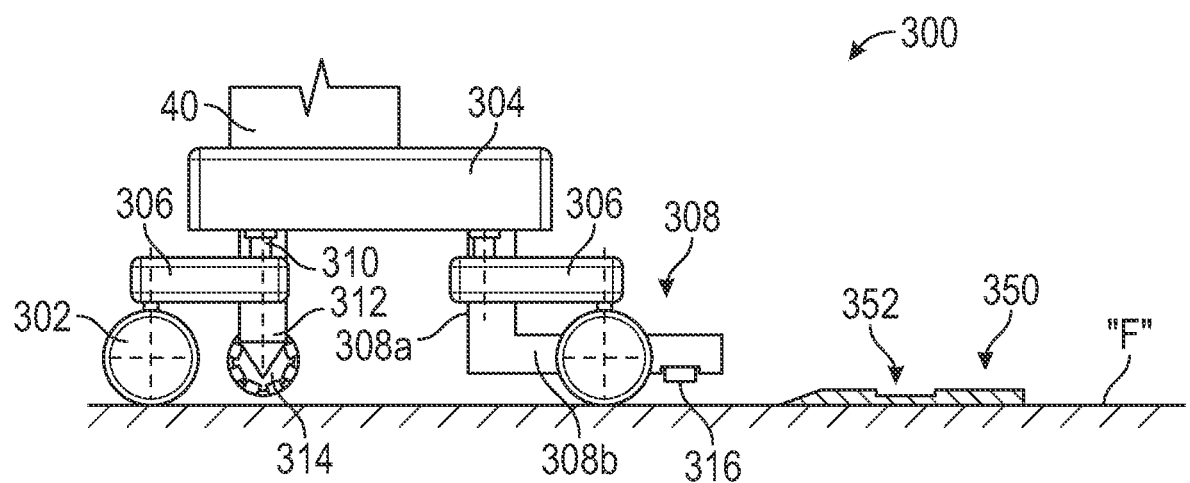
FIG. 7A is a side view illustrating another robotic arm cart including a plurality of wheeled legs, an auxiliary leg supporting a wheel, and a docking stem shown disconnected from a docking rail.
Figure 7B:
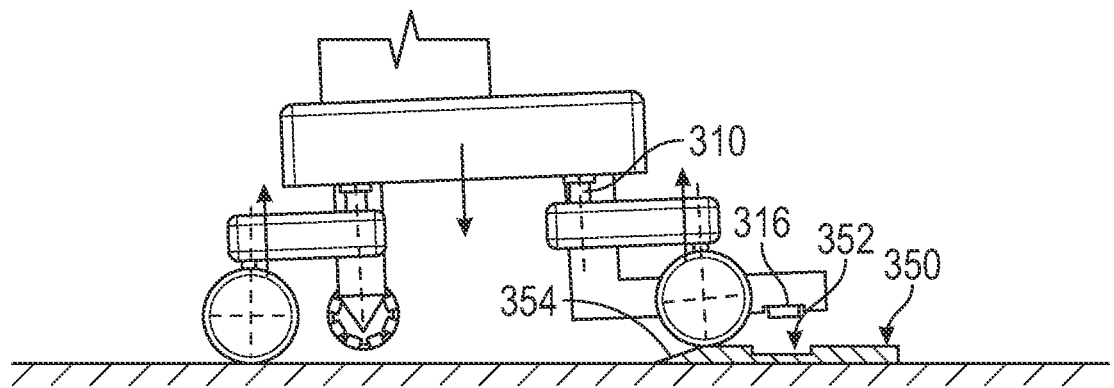
FIG. 7B is a side view illustrating the robotic arm cart of FIG. 7A being positioned on the docking rail.
Figure 7C:
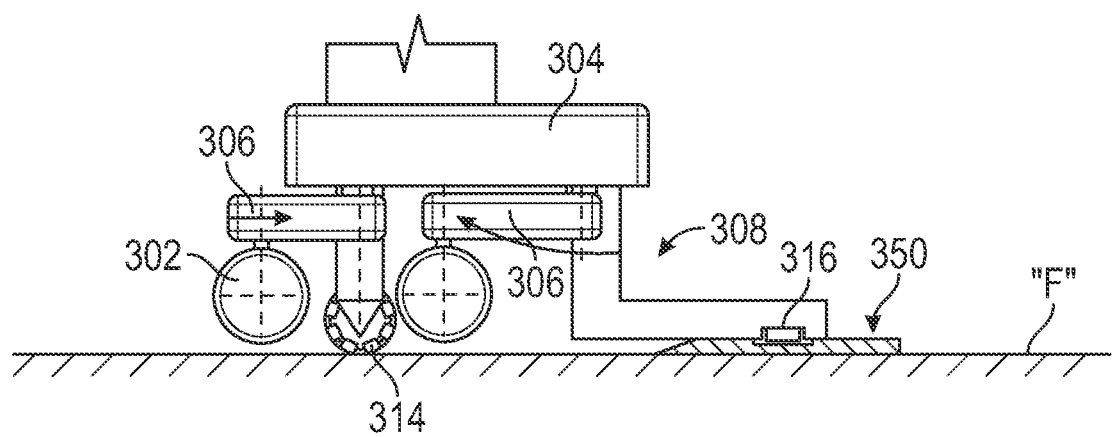
FIG. 7C is a side view illustrating the robotic arm cart of FIG. 7B with the wheeled legs in a retracted state, the auxiliary leg engaged with the floor, and the stem lowered into engagement with the docking rail.

With reference to FIGS. 7A-7C, another type of robotic arm cart 300 and docking station 350 of the surgical robotic system 10 of FIG. 1 is shown. The robotic arm cart 300 is similar to and may include any of the features of the robotic arm cart 100 of FIGS. 4A-4C except as explicitly contradicted below, and the docking station 350 is similar to and may include any of the features of the docking station 150 of FIGS. 4A-4C.

The docking station 350 is secured to the floor "F" of an operating room and surrounds a surgical table (FIG. 3). The docking station 350 is plate-like and defines an elongated channel 352 that extends along the length thereof. The docking station 350 may include a metal or magnet (not explicitly shown) positioned within the channel 352. It is contemplated that electric power and communication may be provided from the docking station 350 to the cart 300 by means of contact free transmission (e.g., near field communication, electromagnetic power transfer, etc.). The electrical interface may also provide for identification of which robotic arm cart 100 (e.g., based on a number in the system or a serial number) is connected to the docking station 300. Additionally, the docking station 350 may integrate a measurement system configured to identify the position of each connected cart 300 along the docking station 350 to provide input for setup planning, optimization, and/or strategies for arm-to-arm collisions.

The robotic arm cart 300 generally includes a base 304 for supporting a robotic arm 40 thereon, a plurality of legs 306 coupled to and extending downwardly from the base 304, an auxiliary leg 312 projecting downwardly from the base 304, and a docking stem 308 projecting from the base 304. The legs 306 have opposing first and second ends with the first end coupled to the base 304 and the second end supporting a wheel 302 (e.g., a caster). One or more of the legs 306 is coupled to the base 304 via a respective joint 310 (e.g., a screw joint) to allow for both rotational movement of the legs 306 from an expanded state (FIGS. 7A, 7B) to a contracted state (FIG. 7C), and a vertical movement of the base 304 relative to the legs 306. The joint 310 may be powered by a motor (not explicitly shown) or the legs 306 may be manually rotated relative to the base 304. In other aspects, the legs 306 may be coupled to the base 304 via a sliding joint, a swivel joint, a screw joint, or the like.

The docking stem 308 has a vertical segment 308a extending downwardly from the base 304 and a horizontal segment 308b extending perpendicularly from the vertical segment 308a such that the docking stem 308 has an L-shape. Other configurations of the docking stem 308 are also contemplated. The horizontal segment 308b has a magnetic element 316 secured to an end thereof configured for receipt in the channel 352 of the docking station 350.

In operation, with a surgical robotic arm 40 secured to the base 304 of the robotic arm cart 300, the robotic arm cart 300 is rolled to a select location along the surgical table with the docking stem 308 adjacent and facing the docking station 350, as shown in FIG. 7A. The robotic arm cart 300 is rolled onto a ramp 354 of the docking station 350 until the magnetic element 316 of the docking stem 308 is suspended above the channel 352 of the docking station 350, as shown in FIG. 7B. The motors in the robotic arm cart 300 are actuated to rotate the joints 310 whereby the base 304 is lowered relative to the legs 306 along a vertical axis.

The continued lowering of the base 304 toward the wheels 302 of the legs 306 ultimately results in a wheel 314 of the auxiliary leg 312 engaging the floor "F" and the wheels 302 of the legs 306 raising off the floor "F," as shown in FIG. 7C. Concurrently with the wheel 314 of the auxiliary leg 312 engaging the floor "F," the magnetic element 316 of the docking stem 308 is received in the channel 352 of the docking station 350 to magnetically couple the docking stem 308 with the docking station 350. In this state, the robotic arm cart 300 remains capable of sliding along and relative to the docking station 350, but is prohibited from rotating relative to the docking station 350, tilting, or moving toward or away from the docking station 350. In aspects, a plurality of magnetic elements 316 may be provided with each having a different magnetic strength. In this way, in surgical situation where no movement of the robotic arm cart 300 relative to the docking station 350 is desired, a stronger magnetic element 316 may be selected.

With the wheels 302 of the legs 306 no longer engaged with the floor "F," the continued rotation of the joints 310 rotates the legs 306 therewith about a single axis defined through the respective joint 310. Accordingly, the wheels 302 of the legs 306 are rotated inwardly toward the base 304 from the expanded state (FIGS. 7A and 7B) to the contracted state (FIG. 7C) to reduce the footprint of the robotic arm cart 300. In aspects, a single actuation of the motors of the robotic arm cart 300 simultaneously lowers the base 304 relative to the legs 306 and rotates the legs 306 relative to the base 304.

Figure 8A:
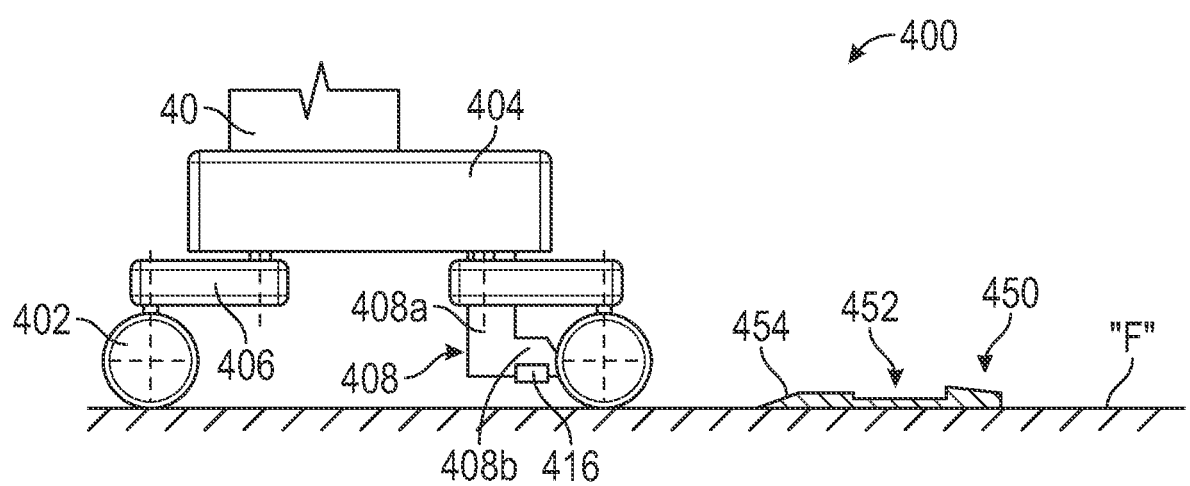
FIG. 8A is a side view illustrating yet another robotic arm cart including a plurality of wheeled legs and a docking stem shown disconnected from a docking rail.
Figure 8B:
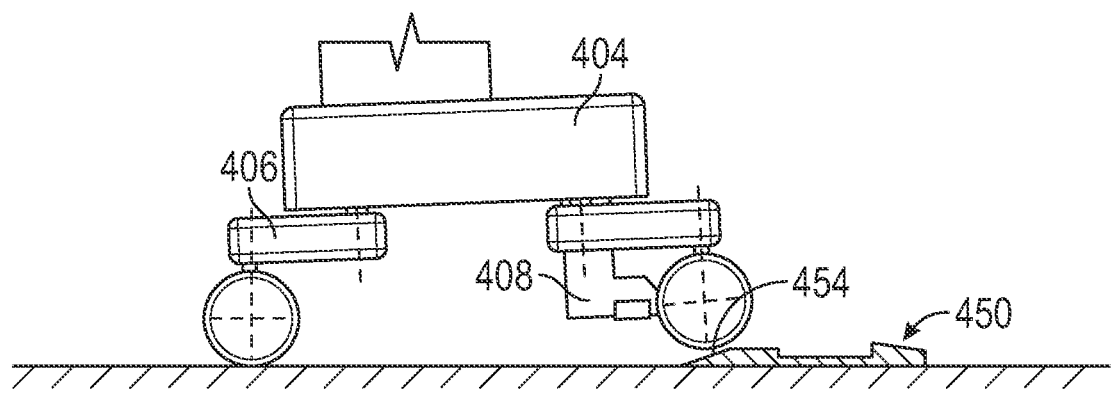
FIG. 8B is a side view illustrating the robotic arm cart of FIG. 8A being positioned on the docking rail.
Figure 8C:
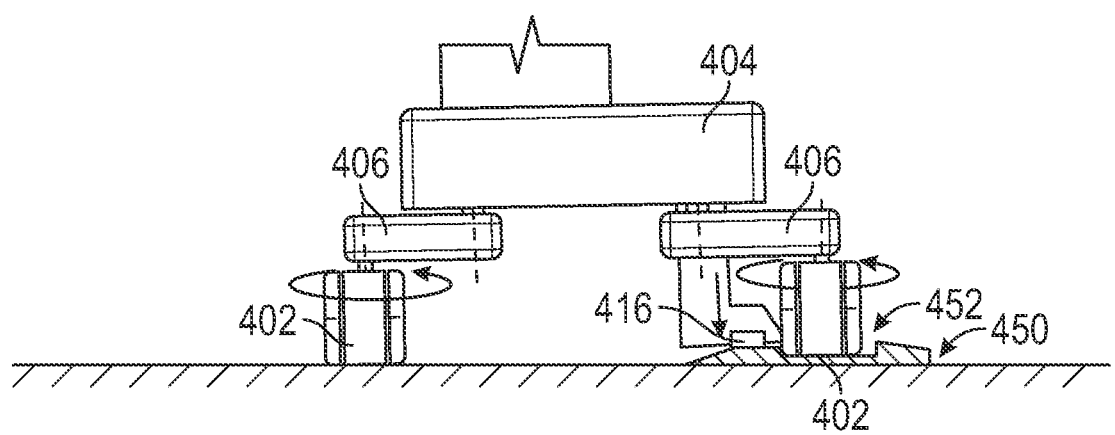
FIG. 8C is a side view illustrating the robotic arm cart of FIG. 8B with the stem lowered into engagement with the docking rail and the wheels being rotated 90 degrees.

With reference to FIGS. 8A-8C, another type of robotic arm cart 400 and docking station 450 of the surgical robotic system 10 of FIG. 1 is shown. The robotic arm cart 400 is similar to and may include any of the features of the robotic arm cart 200 of FIGS. 6A-6C except as explicitly contradicted below, and the docking station 450 is similar to and may include any of the features of the docking station 350 of FIGS. 7A-7C.

The docking station 450 is secured to a floor "F" of an operating room and surrounds a surgical table (FIG. 3). The docking station 450 has a ramped portion 454 and a generally planar upper surface defining an elongated channel 452 that extends along the length thereof. The docking station 450 may be metallic or magnetic.

The robotic arm cart 400 generally includes a base 404 for supporting a robotic arm 40 thereon, a plurality of legs 406 coupled to and extending downwardly from the base 404, and a docking stem 408 projecting from the base 404. The legs 406 have opposing first and second ends with the first end coupled to the base 404 and the second end supporting a caster 402. The docking stem 408 has a vertical segment 408a extending downwardly from the base 404 and a horizontal segment 408b extending perpendicularly from the vertical segment 408a such that the docking stem 408 has an L-shape. The vertical segment 408a is slidably coupled to the base 408 to allow for an adjustment of a vertical position of the horizontal segment 408b relative to the base 404. The horizontal segment 408b has a magnetic element 416 secured to an end thereof configured for magnetic coupling with the docking station 450.

In operation, with a surgical robotic arm 40 secured to the base 404 of the robotic arm cart 400, the robotic arm cart 400 is rolled to a select location along the docking station 450, as shown in FIG. 8A. The front wheels 402 of the robotic arm cart 400 are rolled onto the ramp portion 454 of the docking station 450, as shown in FIG. 8B, and into the channel 452 of the docking station 450. It is contemplated that the channel 452 has a width sufficient to accommodate the front wheels 402 therein in any rotational orientation of the wheels 402.

The wheels 402 may be rotated from a first rotational orientation (FIGS. 8A, 8B) to a second rotational orientation (FIG. 8C) to allow for rolling motion of the robotic arm cart 400 relative to and along the docking station 450. The docking stem 408 is translated along a vertical axis (e.g., via actuation of a motor) relative to the base 404 and toward the floor "F" to engage the magnetic element 416 of the docking stem 408 with the docking station 450. With the robotic arm cart 400 stabilized by the connection between the docking stem 408 and the docking station 450, the rear legs 406 are moved (e.g., pivoted) inwardly from the expanded state to the contracted state to reduce the footprint of the robotic arm cart 400.

In any aspect of the disclosure, the docking stations may integrate electrical interfaces along their length to which the carts may connect for communication and power supply. The electrical interface may be formed by multiple elongated electrical tracks over the length of the docking station (e.g., on the bottom surface of the docking station) and electrical spring contacts (e.g., in the docking stems). The lateral sides of the carts may have additional docking mechanisms such that carts that are placed adjacent one another may be connected to further improve mechanical stability. In aspects, the legs of the carts may be removably attached to the robotic arm carts.

In aspects, the footprint of the robotic arm carts may be automatically changed by the surgical robotic system during a procedure based on the changing dynamics and external loads on the robot arm to configure a stable but small footprint. An active control loop may be based on the commanded motion of the robot, measured dynamics of the robot, and measured external loads on the robot (e.g., user interaction) to generate commanded positions for the movable legs in order to ensure/improve stability. In aspects, the steering angle joint of the casters are designed/controlled in a way that allows for such changes of the footprint, either by having sufficient trail or being actively controlled by motors.

In aspects, the surgical system may include a safe mode in the event of a defect, power-loss, surgical conversion, etc. The safe mode may include switching to a configuration of the robotic arm carts that allows for quickly removing the carts from their positions to evacuate the patient or, for example, creating the most stable wheelbase. During a power-loss, the surgical system may be configured to automatically change the configuration of the robotic arm carts into the enlarged footprint (e.g., via spring loading) by having redundancy (e.g., battery power), and/or having manual interfaces to override the mechanism (e.g., foot pedals).

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

What is claimed is:

1. A robotic arm cart, comprising:
   a base for supporting a robotic arm; and
   a plurality of legs coupled to the base and configured to support the base above a surface, wherein the robotic arm cart is configured to transition between:
   a first state in which the plurality of legs of the robotic arm cart assume a first footprint; and
   a second state in which the plurality of legs of the robotic arm cart assume a second footprint that is different from the first footprint.

2. The robotic arm cart according to claim 1, wherein at least one leg of the plurality of legs is movably coupled to the base such that the at least one leg is configured to move relative to the base between a first position, when the plurality of legs of the robotic arm cart assume the first footprint, and a second position, when the plurality of legs of the robotic arm cart assume the second footprint.

3. The robotic arm cart according to claim 2, wherein the at least one leg is configured to at least one of pivot, swivel, or slide relative to the base between the first position and the second position.

4. The robotic arm cart according to claim 2, wherein each of the plurality of legs is configured to move relative to the base between the first position and the second position.

5. The robotic arm cart according to claim 2, wherein each leg of the plurality of legs defines a respective longitudinal axis, and wherein the plurality of legs are configured to both:
   rotate relative to the base between the first position and the second position, and
   translate along a longitudinal axis of a respective leg of the plurality of legs to lower the base relative to the surface.

6. The robotic arm cart according to claim 1, further comprising a plurality of wheels respectively coupled to an end of the plurality of legs.

7. The robotic arm cart according to claim 6, wherein the plurality of wheels are positioned closer to an outer periphery of the base when the plurality of legs of the robotic arm cart are in the second state than when the plurality of legs of the robotic arm cart are in the first state.

8. The robotic arm cart according to claim 7, wherein the first footprint occupies a larger perimeter than the second footprint.

9. The robotic arm cart according to claim 6, wherein the end of each of the plurality of legs is configured to move relative to the base to move the plurality of wheels between a position further from an outer periphery of the base to a position closer to the outer periphery of the base.

10. The robotic arm cart according to claim 6, further comprising a docking stem extending from the base and configured to engage a docking station.

11. The robotic arm cart according to claim 10, further comprising an auxiliary leg extending downwardly from the base, wherein the auxiliary leg is configured to support the base above the surface when the robotic arm cart transitions to the second state.

12. The robotic arm cart according to claim 11, wherein the auxiliary leg has an end supporting a wheel or a foot, and the plurality of legs are configured to move vertically relative to the base whereby the base is lowered toward the surface and the docking stem engages the docking station and the wheel or foot of the auxiliary leg contacts the surface and supports the base above the surface.

13. A surgical robotic system, comprising:
    a docking station configured to be positioned on a floor of an operating room and adjacent a surgical table; and
    a robotic arm cart including:
    a base for supporting a robotic arm;
    a docking stem coupled to the base and configured to engage the docking station to stabilize the robotic arm cart;
    a plurality of legs coupled to the base and configured to support the base above the floor, at least one leg of the plurality of legs being configured to move relative to the base to transition the robotic arm cart between:
    a first state in which the plurality of legs of the robotic arm cart assume an enlarged footprint; and
    a second state in which the plurality of legs of the robotic arm cart assume a reduced footprint relative to the first state; and
    a plurality of wheels respectively coupled to the plurality of legs.

14. The surgical robotic system according to claim 13, wherein the docking station is configured to be seated on the floor of the operating room and to at least partially surround the surgical table, the docking stem of the robotic arm cart being configured to move vertically relative to the base to selectively engage the docking station.

15. The surgical robotic system according to claim 13, wherein the docking station is a plate configured to magnetically couple to the docking stem.

16. The surgical robotic system according to claim 13, wherein the docking stem is configured to engage the docking station in response to the at least one leg moving relative to the base from an extended position to a retracted position.

17. The surgical robotic system according to claim 16, wherein the robotic arm cart further includes an auxiliary leg extending downwardly from the base, the auxiliary leg being configured to support the base above the floor of the operating room when the at least one leg moves relative to the base from the extended position to the retracted position.

18. The surgical robotic system according to claim 13, wherein the docking station is a rail defining a channel configured for receipt of at least one wheel of the plurality of wheels.

19. The surgical robotic system according to claim 18, wherein the docking stem includes a magnet and is configured to move vertically relative to the base to engage the magnet of the docking stem with the rail.

20. A robotic arm cart, comprising:
  a base for supporting a robotic arm;
  a docking stem coupled to the base and configured to attach to a docking station in an operating room;
  a plurality of legs coupled to the base and configured to support the base above a floor of the operating room; and
  a plurality of wheels respectively coupled to the plurality of legs, wherein the plurality of legs are configured to transition from an expanded state to a contracted state relative to the base to change a configuration of the base of the robotic arm cart.

* * * * *